(12) United States Patent
Cattaruzzi

(10) Patent No.: US 6,623,232 B2
(45) Date of Patent: Sep. 23, 2003

(54) EQUIPMENT FOR MOVING CAGES USED FOR HOLDING AND TRANSPORTING CHICKENS, HENS, AND SIMILAR

(75) Inventor: Bruno Cattaruzzi, Brescia (IT)

(73) Assignee: Cattaruzzi International S.R.L. (IT)

( * ) Notice: Subject to any disclaimer, the term of this patent is extended or adjusted under 35 U.S.C. 154(b) by 17 days.

(21) Appl. No.: 09/952,366

(22) Filed: Sep. 13, 2001

(65) Prior Publication Data

US 2002/0009355 A1 Jan. 24, 2002

Related U.S. Application Data

(63) Continuation-in-part of application No. 09/417,675, filed on Oct. 14, 1999, now Pat. No. 6,341,687.

(30) Foreign Application Priority Data

May 7, 1999 (IT) ........................................ BS990038 U

(51) Int. Cl.$^7$ ............................. B60P 3/04; A01K 29/00
(52) U.S. Cl. ....................... 414/398; 414/384; 414/470; 119/846
(58) Field of Search ................................. 414/398, 384, 414/470; 119/846

(56) References Cited

U.S. PATENT DOCUMENTS

| | | | | |
|---|---|---|---|---|
| 3,167,192 A | * | 1/1965 | Harrison et al. | ........ 414/384 X |
| 3,513,991 A | * | 5/1970 | McWilliams | ............ 414/398 X |
| 4,600,351 A | * | 7/1986 | Nelson | .................... 414/398 X |
| 5,476,353 A |   | 12/1995 | Mola | |
| 5,660,147 A | * | 8/1997 | Wills et al. | .................. 119/846 |
| 5,706,765 A | * | 1/1998 | Horton | ........................ 119/846 |

* cited by examiner

*Primary Examiner*—Steven A. Bratlie
(74) *Attorney, Agent, or Firm*—McGlew and Tuttle, P.C.

(57) ABSTRACT

A transportation arrangement includes a closed track with a chain running along the closed track. A plurality of base frames are arranged on the chain and move along the track by the chain which is powered by a motor. A plurality of counter frames are each pivotally connected to a pivot edge of one of the base frames where the pivot edge of the base frames is arranged at a radially inside edge of the base frames with respect to the closed track. A lifting station is arranged at the closed track, with the chains moving the base frames into and away from the lifting station. A lifting jack in the lifting station raises a lifting edge of the counter frames located at the lifting station. The lifting jack pivots the counter frame about the pivot edge of the base frame. The base frames are attached to a portion of the chain, and are rotatable with respect to the portion of the chain to which the respective base frames are attached.

20 Claims, 5 Drawing Sheets

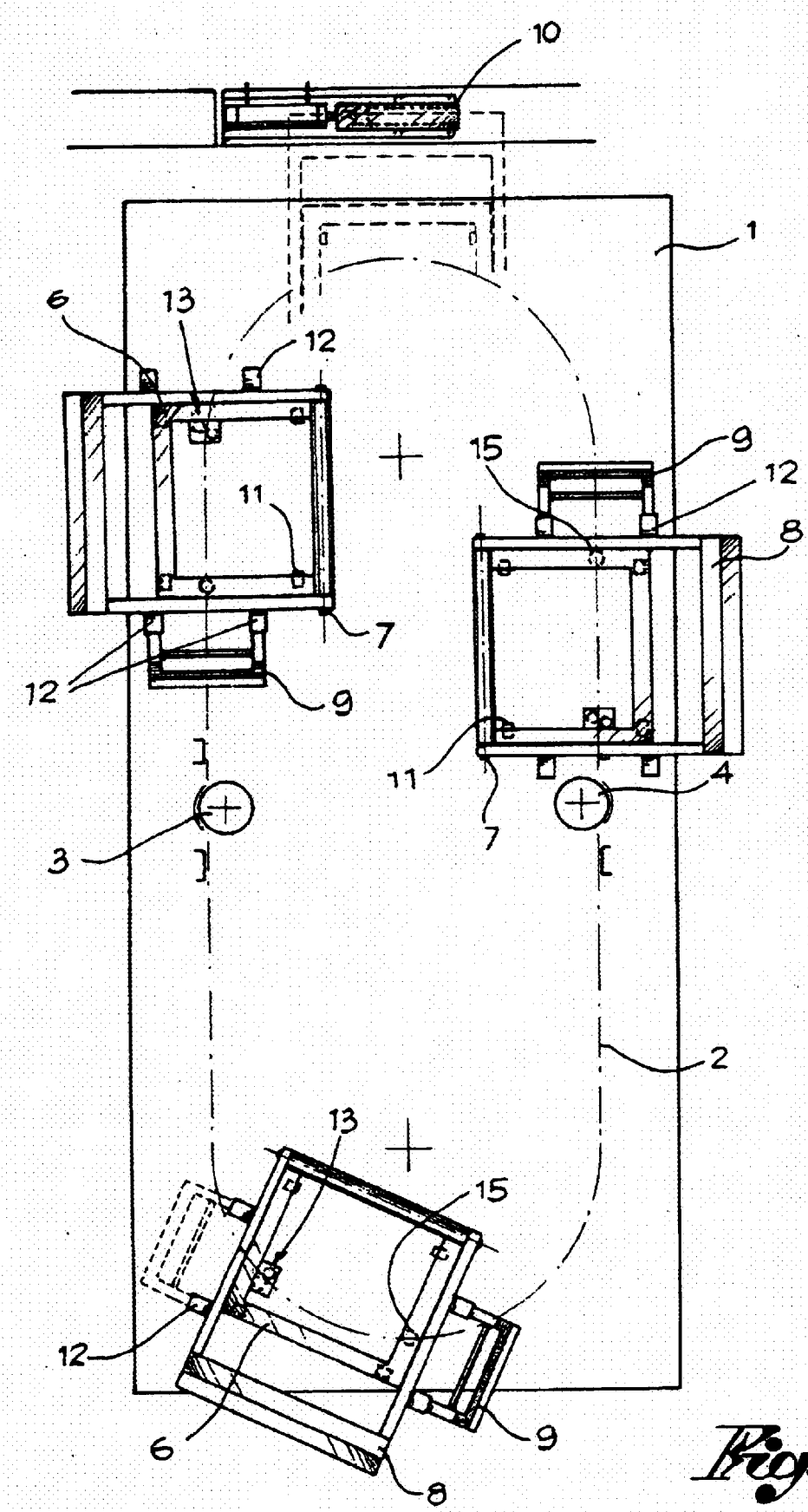

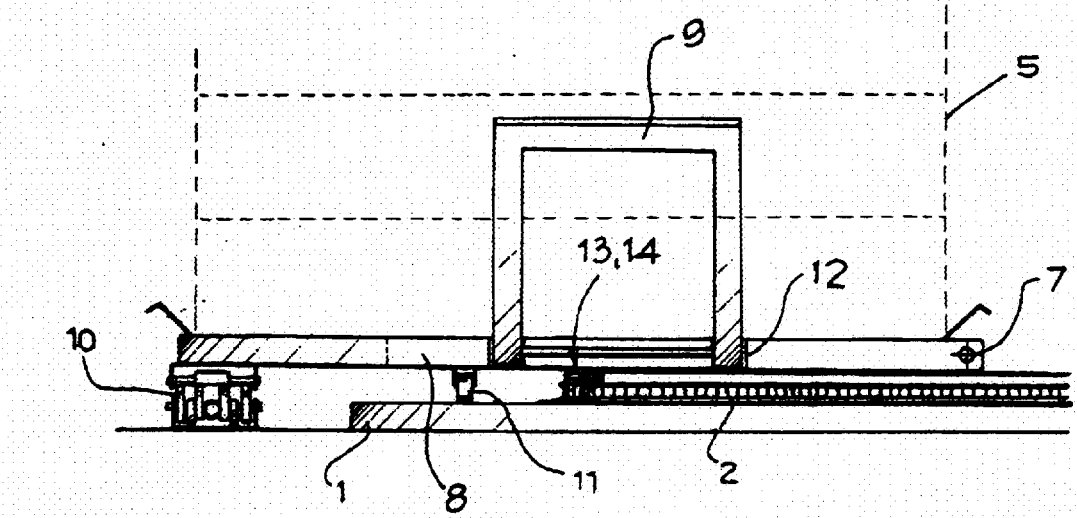
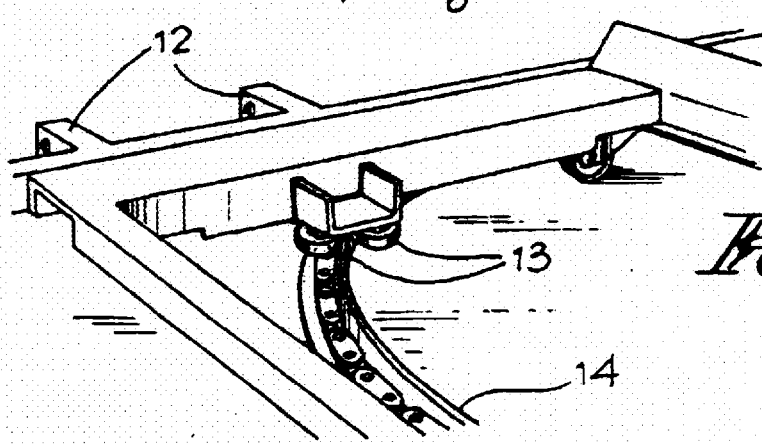
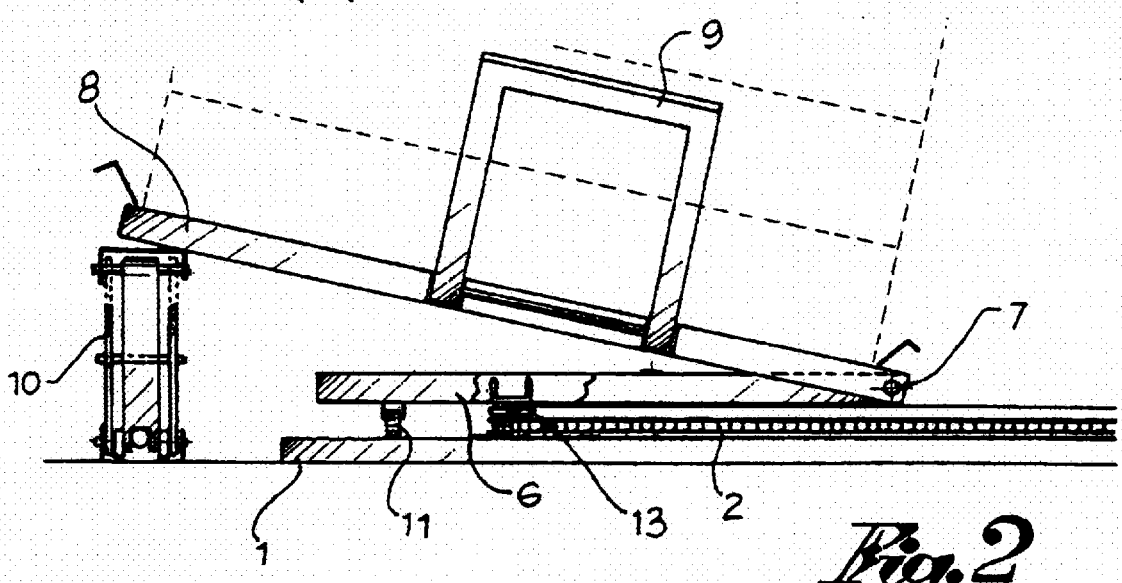

EQUIPMENT FOR MOVING CAGES USED FOR HOLDING AND TRANSPORTING CHICKENS, HENS, AND SIMILAR

RELATED APPLICATIONS

This is a continuation-in-part of application Ser. No. 09/417,675 filed Oct. 14, 1999 now U.S. Pat. No. 6,341,687, and the entire disclosure of this prior application is considered to be part of the disclosure of the accompanying application and is hereby incorporated by reference therein.

FIELD OF THE INVENTION

The model in question concerns equipment suitable for large boxes, in this case, intended for use in chicken farms and, in particular, to move the large cages holding the animals during loading, unloading and transportation.

BACKGROUND OF THE INVENTION

Similar equipment is already in use, where the cages are accommodated during the first phase of loading, before being transferred by means of the appropriate devices, which essentially consist of thrust-blocks, each operated by a motor. These thrust-blocks then being transferred, by other motorized means, onto the crying structure of said equipment.

However, these solutions, apart from being particularly complicated and expensive, are of limited use in those poultry farms with low ceilings, where the use of moving equipment may be awkward or unsafe. Another important problem connected with the above-mentioned equipment concerns the centrifugal force to which the cages are subjected during the simultaneous movements of transfer and rotation, which brings risks of instability for the whole structure and, therefore, a source of danger to the operators.

Finally, those structures already existing do not exploit the work cycles in a rational way, leaving down time between the various phases of loading, unloading and picking up of the cages.

SUMMARY AND OBJECTS OF THE INVENTION

The main aim of the equipment in question is to avoid such inconveniences by adopting new and different components, without altering the functionality and use of the equipment itself.

The present invention accomplishes this aim by providing a deck movable with the mobile conveyor along aground surface. The deck is preferably embodied as trailer which can be towed to and around the work site, and possible behind the mobile conveyor. The mobile conveyor also moves along the ground and collects items, such as chickens, and transfers the chickens to cages on the movable deck. The deck includes a ground support such as one or more wheels, or skids, movably supporting the deck on the ground surface. A closed track is mounted on the deck and is substantially parallel with the deck. Both of the deck and the closed track are movable together to follow the mobile conveyor as it collects items. A chain runs alongside the closed track and pulls a plurality of base frames around the track. The base frames are pivotally connected to the chain, and are movable along the track and along the deck by the chain. The ground support is arranged on a side of the deck diametrically opposite the base frames, and the deck is substantially horizontal.

A loading station is arranged on the deck, and the base frames are movable by the chain and the track into the loading station where the base frames receive the cages. A filling station is also arranged on the deck with the base frames being movable by the chain and the track into the filling station where the cages are filled by the mobile conveyer. The base frames are arranged on the chain and the track to place one of the base frames in the loading station and another of the base frames in the filling station substantially simultaneously.

Another loading station can also be arranged on the deck. The loading station and the another loading station are arranged on one side or end of the deck to be receivable of the cages from the one side or end of the deck. Each of the loading station and the another loading station being arranged on the one end of the deck to arrange the cages in a different position at the filling station. The loading station and the another loading station being preferably on the right and left sides of the one end of the deck, so as to have an operator selectively place the cages with a right or left side facing the radial inside of the track.

Stop connectors are arranged at opposite sides of each of the base frames, and stop brackets are connectable to either one of the stop connectors on the base frames. The stop brackets stop the cages as they are loaded onto the base frames and prevent the cages from overshooting the frames. The stop brackets are connectable to either side, depending on which loading station is used.

A plurality of counter frames are each pivotally connected to a pivot edge of one of the base frames, where the pivot edge of the base frames is arranged at a radially inside edge of the base frames with respect to the closed track. The base frame holds a respective counter frame substantially parallel to the deck during moving of the frames along the deck.

A lifting device is arranged at the filling station and is liftable of the counter frames to have a radial outside edge of the counter frames be spaced from the deck at the filling station. This lifting makes it easier for the items to be inserted or almost poured into side openings on the cages. The lifting device angularly spaces the counter frame from the deck with the radial outside edge of the counter frames being arranged above the deck. The lifting device is preferably spaced from the closed track.

In a preferred embodiment, the plurality of base frames are limited to three frames equally spaced apart on the chain with the three frames being movable substantially simultaneous into all of the stations.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a plan view of the whole equipment;

FIG. 2 is a schematic diagram of the bottom of a cage during the loading phase;

FIG. 3 is a schematic diagram of a cage with the means for moving the cage;

FIG. 4 is a close-up schematic diagram of the means for guiding the cages;

DESCRIPTION OF THE PREFERRED EMBODIMENT

Figure 5:
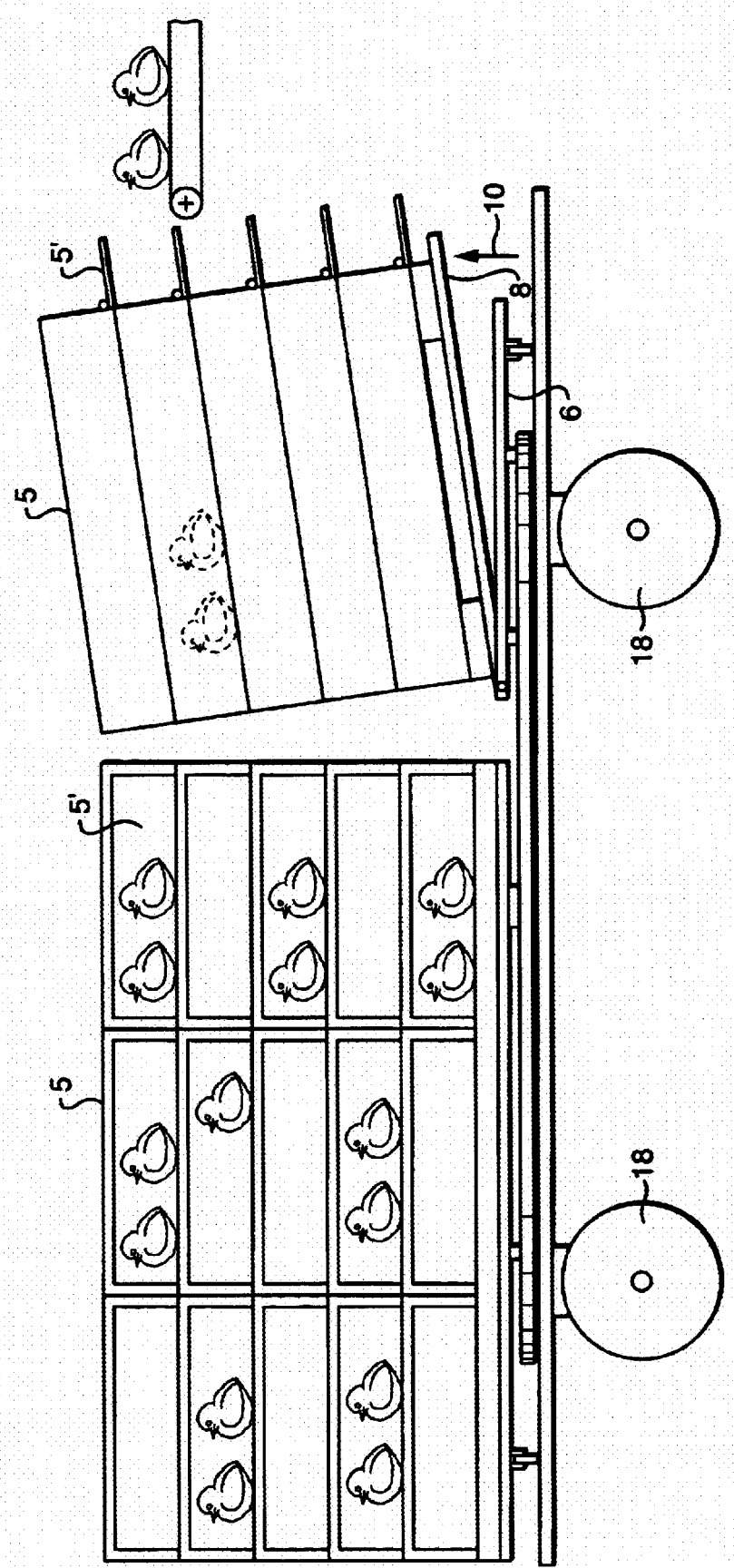
FIG. 5 is a side view of the invention.

Referring to the drawings, and in particular to FIG. 1, the deck 1 of the trailer forms the base for the equipment. Upon this deck 1, a chain 2 is mounted and guided by a guide rail or track 14. The chain is operated by a motor 3 and kept under tension by a chain-stretcher 4. Onto the chain 2, there are fastened at pivot points 15 three base frames 6. The base frames 6 have a pivot edge 7. Counter-frames 8 are hinged to the pivot edges 7 of the base frames 6, and are free to pivot horizontally. Cages 5 are placed on the counter frames 8 and the cages 5 pivot with the counter frames 8.

Furthermore, the counter-frames 8 are equipped with checks or stop brackets 9 against which the cages 5 come to rest as the cages 5 are loaded onto the counter frames 8. The checks 9 are insertable into either one of two stop connectors on opposite sides of the counter-frames 8. The stop connectors are preferably formed as slots 12 on opposite sides of the base frames 7 or counter-frames 8. Such a disposition of the stop brackets means that the position of the cages 5 on the counter-frames 8, or the side of the counter frames 8 which receive the cages, may be reversed according to their loading direction.

Bearings 13 are also fixed to the counter-frames 8, to guide the latter along the guide rail or track 14 of the chain 2, in such a way as to create two constraints for the counter-frames 8, namely the fastening device or pivot point 15 and the bearings 13. In addition, the base frames 6 are positioned on the chain 2 in such a way that their centers of rotation and transfer are sufficiently far apart to divide the chain 2 into three parts of equal length, thereby keeping the cages 5 at an equal distance from one another.

At one longitudinal end of the deck 1, and external to the deck, a hydraulic jack formed as a parallelogram 10, which is already known, is used to holdup the counter-frame 8, and consequently the cage 5, during the filling phase, so that the animals can be put inside the cages 5 more easily. Once the counter frame 8 and cage 5 is lowered back down, the cage 5 can be moved with its full load. The frames 6 are also equipped with a deck support such as wheels 11 to help them run along the deck 1.

With the structure set up in this way, that is, without the motorized thrust-blocks for support and rotation of the cages with their animal loads, it is ideal for managing simultaneously the phases off fling the cages 5 with animals, and at the same time picking up the full cage 5 and loading another empty cage 5. It can ensure that the shuttle vehicles E responsible for moving the cages 5 will always position them identically in front of the operator, irrespectively of the position, left or right, of the loading door on the cage and the rotating direction of the chain 2, as well as placing the cages 5 with their respective animal-loading doors 5' in the same position during the phases of picking up an full cage 5 and loading an empty cage 5.

Figure 6:
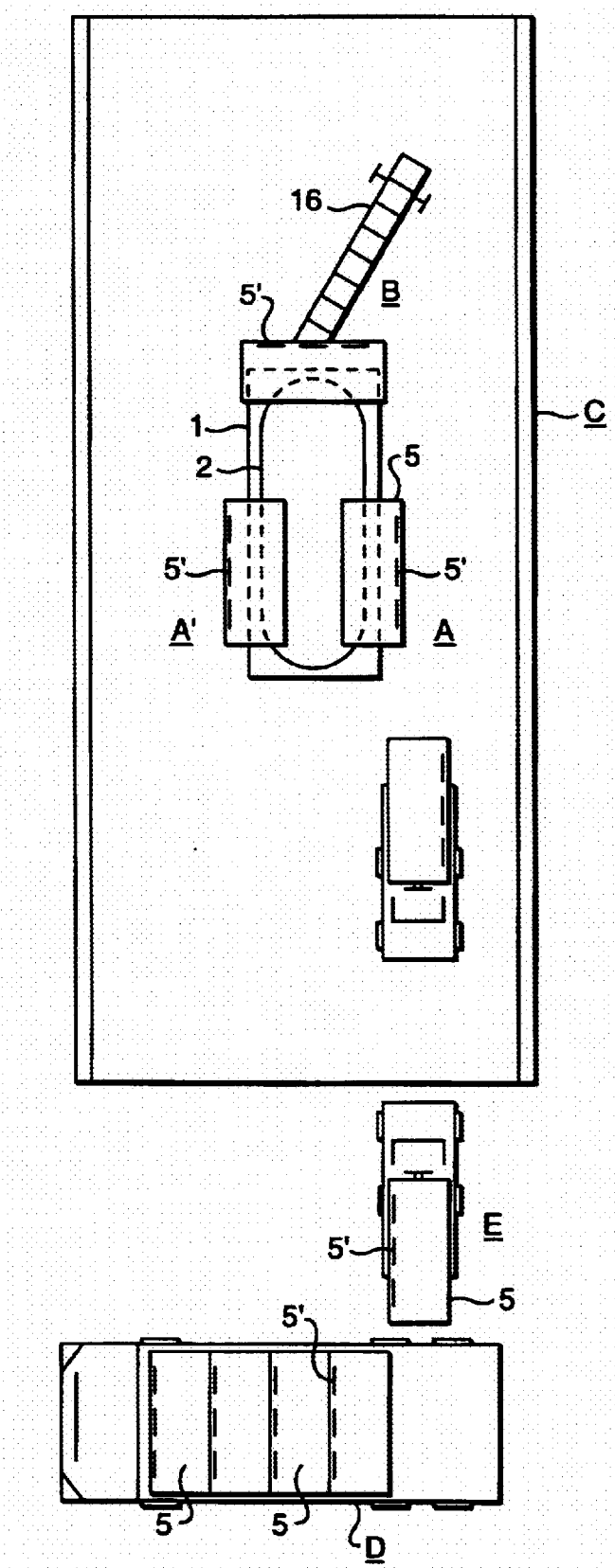
FIG. 6 is a plan view of the invention and the surrounding worksite.
Figure 7:
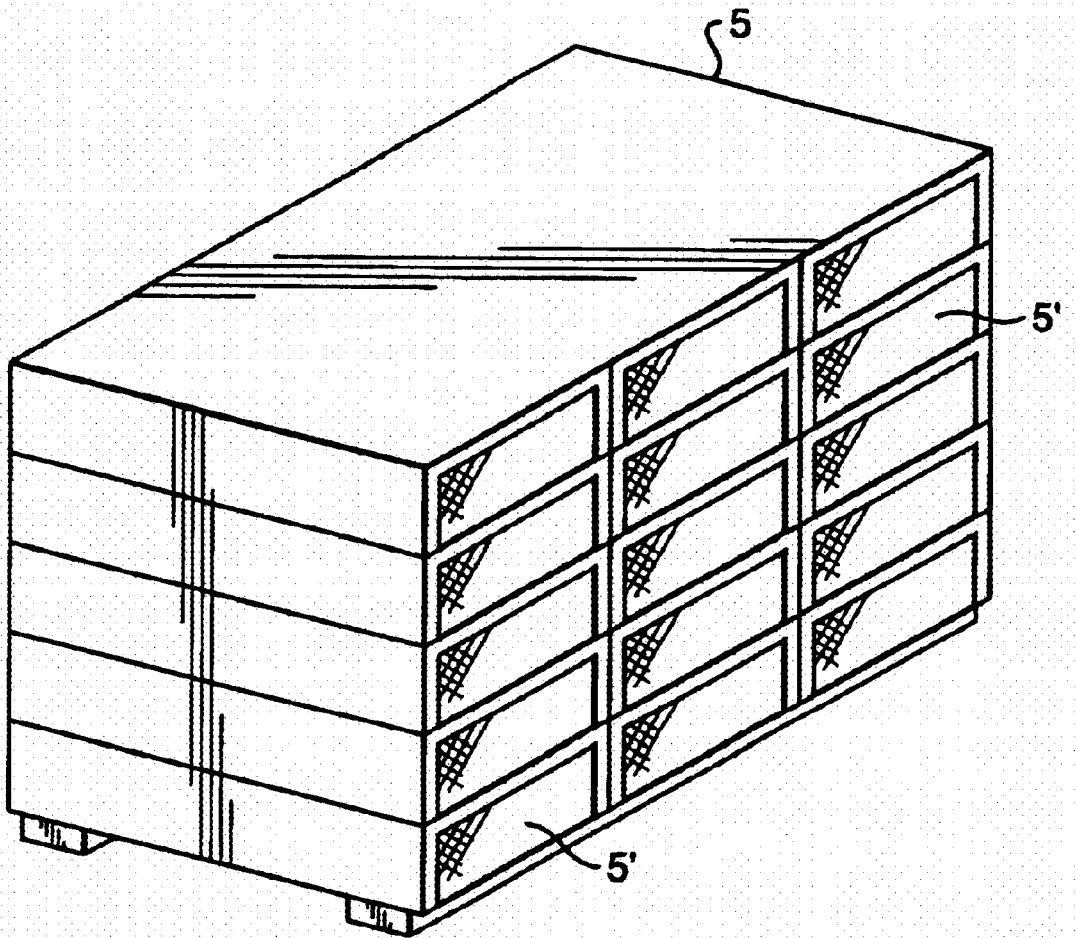
FIG. 7 is a perspective view of a cage.

The deck 1 is mounted on ground supports, preferably wheels 18 and the whole transportation device is portable in the manor of a trailer, or can have means for self propulsion. As shown in FIG. 6, the deck 1 is arranged in a building C and associated with a mobile conveyer 16. As the mobile conveyer 16 moves through the building C collecting items, the entire transportation device moves with the mobile conveyer. Shuttle vehicles E, such as fork lift trucks, shuttle the cages 5 from the cargo trucks D to the deck 1. In the embodiment of FIG. 6, the shuttle vehicles E place the cages on the frames at loading station A. This places the doors 5' of the cages 5 in the proper position at filling station B, for the mobile conveyer 16 to fill the cages 5. If the cargo truck D and deck 1 where arranged differently so that the doors 5' would be on a different side relative to the shuttle E, the shuttle E would place the cage 5 at the alternate loading station A' and this would properly the doors 5' at the filling station B.

Exactly three frames equally spaced on the chain, a filling station B arranged at a curved end of the track 14 and loading stations A, A' arranged at a longitudinal side of the track 14, is very beneficial in being able to arrange an empty cage 5 on a frame or carrier along a longitudinal side of the deck 1, as it is unloaded from the cargo truck D to the loading station A, and to have the filling station B where the poultry are loaded into the cage be perpendicular to the station A at the curve of the chain route. The cage 5 full of poultry can then return to the same loading station A to be picked up and loaded onto the truck. The empty cages 5 on the cargo truck D may have the doors 5' forwards or backwards, and after filling they must be repositioned on the cargo truck D in the same direction. Depending on the direction of the cage doors 5', the cages 5 can be placed on the carriers at either the right or left hand side of the track 14 as shown in the drawings. The carriers can be moved on the deck in a clockwise or anticlockwise direction, depending on need, to correspond with the direction of the cages 5 whose doors 5' must always be turned towards the outside of the closed track 14 to be able to load the poultry in the filling station B. The equal spacing causes the carriers to simultaneously arrive at the stations regardless of which direction they move around the track 14. The cages 5 can therefore always be easily positioned with the doors 5' outward, and moved into the stations for efficient operations and minimum downtime.

The above description makes clear how one of the other aims has been achieved, namely that of reducing the height from the ground of the plane 1 and, thereby, of the cages with respect to the poultry farm where the structure is being employed. Likewise, the rotatory movement of the cages around their own axes has been eliminated, significantly reducing the centrifugal force to which the cages are subjected.

While specific embodiments of the invention have been shown and described in detail to illustrate the application of the principles of the invention, it will be understood that the invention may be embodied otherwise without departing from such principles.

What is claimed is:

1. A transportation device of cages for a mobile conveyer, the transportation device comprising:
    a deck movable with the mobile conveyor along a ground surface;
    a closed track on said deck, said closed track being substantially parallel with said deck, said closed track being movable with said deck;
    a chain running along said closed track;
    a plurality of base frames pivotally connected to said chain and movable along said track and along said deck by said chain, said base frames being receivable of the cages in first and second different angular positions with respect to said deck.

2. A transportation device in accordance with claim 1, further comprising:
    a loading station on said deck, said base frames being movable by said chain and said track into said loading station where said base frames are receivable and releaseable of the cages;

a filling station on said deck, said base frames being movable by said chain and said track into said filling station where said cages are fillable from the mobile conveyer, said base frames being arranged on said chain and said track to place one of said base frames in said loading station and another of said base frames in said filling station substantially simultaneously.

3. A transportation device in accordance with claim 2, further comprising:

another loading station on said deck, said loading station and said another loading station being arranged on one side of said deck to be receivable and releaseable of the cages from said one side of said deck, each of said loading station and said another loading station being arranged on said one side of said deck to arrange the cages said two different angular positions at said filling station.

4. A transportation device in accordance with claim 3, further comprising:

stop connectors arranged at opposite sides of each of said base frames;

stop brackets connectable to either one of said stop connectors on said base frames, said stop brackets being stoppable of the cages loaded onto said base frames.

5. A transportation device in accordance with claim 3, wherein:

said plurality of base frames are limited to three frames equally spaced apart on said chain with said three frames being movable substantially simultaneous into said stations.

6. A device in accordance with claim 3, wherein:

the cages have loading doors on one side of the cages, said first angular position of the cages at said loading station arranges the loading doors of the respective cages in a filling position for filing at said filling station, said second angular position of the cages at said another loading station arranges the loading doors of the respective cages in said filling position.

7. A transportation device in accordance with claim 2, wherein:

said closed track has a longitudinal side and curved ends;

said filling station is arranged at one of said curved ends of said closed track;

said loading station is arranged at said longitudinal side of said closed track.

8. A transportation device in accordance with claim 1, further comprising:

a plurality of counter frames each pivotally connected to a pivot edge of one of said base frames, said pivot edge of said base frames being arranged at a radially inside edge of said base frames with respect to said closed track.

9. A transportation device in accordance with claim 8, wherein:

said base frame holds a respective said counter frame substantially parallel to said deck during moving of said frames along said deck.

10. A transportation device in accordance with claim 9, further comprising:

a filling station on said deck, said base frames being movable by said chain and said track into said filling station where said cages are fillable;

a lifting device at said filling station and liftable of said counter frames to arrange a radial outside edge of said counter frames spaced from said deck at said filling station.

11. A transportation device in accordance with claim 10, wherein:

said lifting device angularly spaces said counter frame from said deck with said radial outside edge of said counter frames being arranged above said deck.

12. A transportation device in accordance with claim 10, wherein:

said lifting device is spaced from said closed track.

13. A transportation device in accordance with claim 1, further comprising:

a bearing arranged on each of said base frames and spaced from a portion of said chain connected to a respective said base frame, said bearing guiding said base frames on said closed track.

14. A transportation device in accordance with claim 1, wherein:

each of said base frames have a deck support spaced from said chain and supporting a respective said base frame on said deck.

15. A device in accordance with claim 1, wherein:

said first and second different angular positions are angularly spaced by substantially 180 degrees.

16. A device in accordance with claim 1, further comprising:

a reverseable drive motor connected to said chain and selectively movable of said plurality of base frames in two opposite directions around said track.

17. A cage transportation device comprising:

a deck:

a closed track on said deck, said closed track being substantially parallel with said deck, said closed track being movable with said deck;

a chain running along said closed track;

a plurality of base frames pivotally connected to said chain and movable along said track and along said deck by said chain;

a loading station on said deck, said base frames being movable by said chain and said track into said loading station where said base frames are receivable and releaseable of the cages;

a filling station on said deck, said base frames being movable by said chain and said track into said filling station where said cages are fillable, said base frames being arranged on said chain and said track to place one of said base frames in said loading station and another of said base frames in said filling station substantially simultaneously;

another loading station on said deck, said loading station and said another loading station being arranged on one side of said deck to be receivable and releaseable of the cages from said one side of said deck, each of said loading station and said another loading station being arranged on said one side of said deck to receive the cages in first and second different angular positions with respect to said decks.

18. A device in accordance with claim 17, wherein:

the cages have loading doors on one side of the cages, said first angular position of the cages frames at said loading station arranges the loading doors of the respective cages in a filling position for filling at said filling station, said second angular position of the cages at said another loading station arranges the loading doors of the respective cages at said filling position.

19. A cage transportation device comprising:

a deck, a closed track on said deck, said closed track being substantially parallel with said deck, said closed track being movable with said deck;

a chain running along said closed track;

a plurality of base frames pivotally connected to said chain and movable along said track and along said deck by said chain;

a plurality of counter frames each pivotally connected to a pivot edge of one of said base frames and receivable of cages, said pivot edge of said base frames being arranged at a radially inside edge of said base frames with respect to said closed track;

said base frame supports a respective said counter frame substantially parallel to said deck during moving of said frames along said deck;

a filling station on said deck, said base frames being movable by said chain and said track into said filling station where the cages are fillable by a mobile conveyer;

a lifting device at said filling station and liftable of said counter frames to arrange a radial outside edge of said counter frames spaced from said deck at said filling station.

20. A transportation device in accordance with claim 19, wherein:

said lifting device angularly spaces said counter frame front said deck with said radial outside edge of said counter frames being arranged above said deck.

* * * * *